Figure 1:
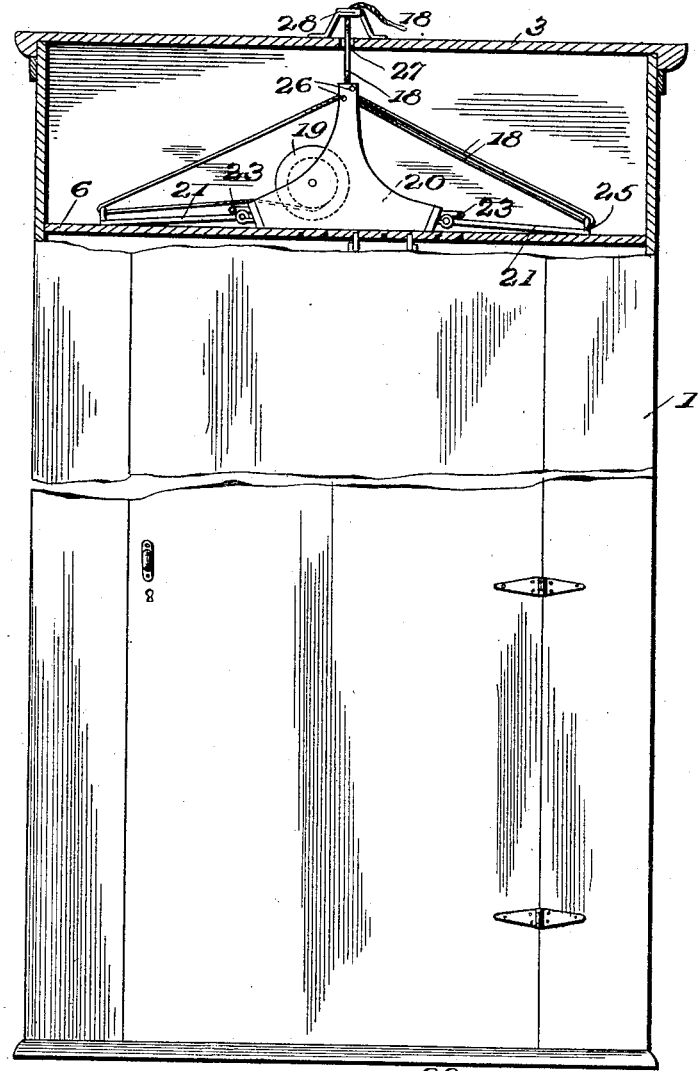

W. AND W. A. CRABTREE.
TWINE HOLDER.
APPLICATION FILED MAY 21, 1918.

1,389,863.

Patented Sept. 6, 1921.

WITNESSES

INVENTOR
Walter A. Crabtree
Wesley Crabtree
BY

ATTORNEYS

UNITED STATES PATENT OFFICE.

WESLEY CRABTREE AND WALTER ALLEN CRABTREE, OF PORTSMOUTH, OHIO.

TWINE-HOLDER.

1,389,863.     Specification of Letters Patent.     Patented Sept. 6, 1921.

Application filed May 21, 1918. Serial No. 235,794.

*To all whom it may concern:*

Be it known that we, WESLEY CRABTREE and WALTER ALLEN CRABTREE, citizens of the United States, and residents of Portsmouth, in the county of Scioto and State of Ohio, have made new and useful Improvements in a Twine-Holder, of which the following is a specification.

Our invention is an improvement in bag and twine holders, and has for its object to provide a holder of the character specified wherein bags of various sizes may be stored to be withdrawn when desired for use, wherein practically all the space within the holder is utilized to the best possible advantage, and wherein both twine and the various sizes of bags are accessible from either side of the holder.

Figure 2:
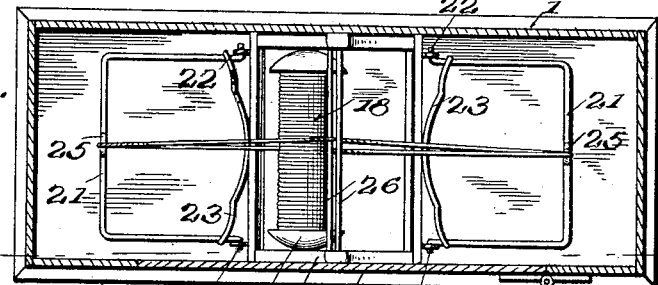

In the drawings:

Figure 1 is a vertical section at the upper end of the device, Fig. 2 is a plan view with the cover removed.

In the present embodiment of the invention, the twine holder is arranged in the uppermost compartment of a casing 1, having a removable top or cover 3, and the twine holder is supported by the uppermost partition 6 of the casing. The twine, indicated at 18, is mounted upon a reel 19, which is journaled in a bracket 20 secured to the top of the topmost partition 6. At each side of the partition is arranged a tensioning or take-up frame 21, the said frames being substantially U-shaped, each comprising a body and arms, the arms being pivoted to the bracket as indicated at 22, while the bodies lie upon the partition 6.

The twine passes from the reel outwardly through an eye 25 on the body of that frame 21 at the left of Fig. 3, thence upwardly between a pair of rods 26 mounted at the top of the bracket 20 and then downwardly through the eye 25 of the other frame, from whence the twine passes upwardly beneath the uppermost rod 26 and out through the opening 27 in the cover 3. Here the twine passes through an eye 28 held in spaced relation above the cover, and depends alongside the casing. The twine is thus accessible from either end of the casing. When the twine is withdrawn, the take-up frames first assume an upright or vertical position and in doing so their arms come into contact with the yielding arms of a spring 23, whose intermediate portion is secured to the bracket. After assuming this position, the reel of twine turns, and when the twine is released, the pressure of the arms of the spring 23 upon the arms of the take ups, causes the take-up frames to fall down flat, in a horizontal position, and in this way take up a goodly portion of the twine which is suspended on the outside of the cabinet.

We claim:

1. In a device of the character specified a twine holder comprising a reel, a bracket supporting said reel, U-shaped frames pivotally attached at their open ends to said brackets the end bar of said frames having guides adjacent their centers, a cushioning and repelling member for said frames having flexible arms adapted to be engaged by the said U-shaped frames, a pair of guides, bars mounted on said bracket above the reel in spaced and parallel relation, and a paying out guide for the twine, disposed above said guide bars.

2. In a device of the character specified, a twine holder comprising a reel, a support for the reel, substantially U-shaped members hinged to the end of the support, each having an eye at the end remote from the support through which the twine is adapted to pass, and a pair of rods above the reel arranged approximately parallel with the axis thereof in spaced and parallel relation between which the twine passes.

WESLEY CRABTREE.
WALTER ALLEN CRABTREE.

Witnesses:
HELEN HOFFMAN,
THOMAS C. BEATTY.